United States Patent
Wang et al.

(10) Patent No.: US 10,375,523 B2
(45) Date of Patent: Aug. 6, 2019

(54) LOCATION INFORMATION OBTAINING METHOD AND DEVICE

(71) Applicant: Huawei Technologies Co., Ltd., Shenzhen (CN)

(72) Inventors: Jian Wang, Beijing (CN); Xiaocui Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/650,604

(22) Filed: Jul. 14, 2017

(65) Prior Publication Data

US 2017/0318428 A1 Nov. 2, 2017

Related U.S. Application Data

(63) Continuation of application No. PCT/CN2015/070924, filed on Jan. 16, 2015.

(51) Int. Cl.
| | | |
|---|---|---|
| *H04W 4/02* | (2018.01) | |
| *G01S 5/02* | (2010.01) | |
| *H04L 29/08* | (2006.01) | |

(52) U.S. Cl.
CPC .......... *H04W 4/025* (2013.01); *G01S 5/0205* (2013.01); *G01S 5/0252* (2013.01); *G01S 5/0284* (2013.01); *H04L 67/18* (2013.01); *H04W 4/02* (2013.01); *H04L 67/12* (2013.01); *Y02D 70/00* (2018.01)

(58) Field of Classification Search
CPC ................................. H04W 4/02; H04W 4/025
See application file for complete search history.

(56) References Cited

U.S. PATENT DOCUMENTS

| | | | |
|---|---|---|---|
| 8,000,724 B1 * | 8/2011 | Rayburn ............... | G01S 5/0027 370/310 |
| 2007/0184845 A1 | 8/2007 | Troncoso | |
| 2008/0101277 A1 * | 5/2008 | Taylor ................... | G01S 5/0289 370/328 |
| 2012/0136623 A1 | 5/2012 | Edge et al. | |
| 2014/0241189 A1 * | 8/2014 | Larsen ................. | G01S 5/0226 370/252 |
| 2015/0018017 A1 * | 1/2015 | Jang ...................... | H04W 76/14 455/456.5 |
| 2015/0119068 A1 * | 4/2015 | Kudekar ............... | H04W 4/043 455/456.1 |

FOREIGN PATENT DOCUMENTS

| | | |
|---|---|---|
| CN | 101305567 A | 11/2008 |
| CN | 101384070 A | 3/2009 |
| CN | 101485175 A | 7/2009 |
| CN | 103154764 A | 6/2013 |
| CN | 104837112 A | 8/2015 |
| EP | 2637033 A1 | 9/2013 |
| WO | 9815911 A1 | 4/1998 |

* cited by examiner

*Primary Examiner* — Christopher M Brandt
(74) *Attorney, Agent, or Firm* — Slater Matsil, LLP (57) ABSTRACT

Embodiments provide a location information obtaining method and a device, and relates to the communications field. The method includes: obtaining, by a network device, location information of a reference point and location information of first user equipment; determining, by the network device, relative location information of the first user equipment relative to the reference point; and sending, by the network device, the location information of the reference point and the relative location information of the first user equipment relative to the reference point.

15 Claims, 6 Drawing Sheets

LOCATION INFORMATION OBTAINING METHOD AND DEVICE

CROSS-REFERENCE TO RELATED APPLICATIONS

This application is a continuation of International Application No. PCT/CN2015/070924, filed on Jan. 16, 2015, the disclosure of which is hereby incorporated by reference in its entirety.

TECHNICAL FIELD

The present invention relates to the communications field, and in particular, to a location information obtaining method and a device.

BACKGROUND

With booming development of a wireless broadband network and a mobile communications technology, a device-to-device communications (D2D) technology emerges as the times require.

For a D2D network, user equipment need to obtain location information of each other in some situations. However, in the prior art, user equipment can obtain location information of the user equipment itself only by using a method such as Global Positioning System (GPS) positioning or base station positioning in a mobile communications network, but cannot obtain location information of another user equipment.

SUMMARY

Embodiments of the present invention provide a location information obtaining method and a device, so that user equipment can obtain an actual location of another user equipment in a D2D network.

To achieve the foregoing objective, the following technical solutions are used in the embodiments of the present invention.

According to a first aspect, a location information obtaining method is provided. The method includes obtaining, by a network device, location information of a reference point and location information of first user equipment. The method also includes determining, by the network device, relative location information of the first user equipment relative to the reference point. The method also includes sending, by the network device, the location information of the reference point and the relative location information of the first user equipment relative to the reference point.

With reference to the first aspect, in a first feasible manner, the sending, by the network device, the relative location information of the first user equipment relative to the reference point includes: sending, by the network device, the relative location information of the first user equipment relative to the reference point by using a broadcast channel.

With reference to the first aspect, in a second feasible manner, the relative location information includes at least one of relative longitude location information, relative latitude location information, or relative altitude location information.

With reference to the second feasible manner, in a third feasible manner, the relative location information includes: a transmission value of the relative longitude location information, a transmission value of the relative latitude location information, and a transmission value of the relative altitude location information; or a granularity of the relative longitude location information and a transmission value of the relative longitude location information, a granularity of the relative latitude location information and a transmission value of the relative latitude location information, and a granularity of the relative altitude location information and a transmission value of the relative altitude location information; where the relative longitude location information is equal to a product of the granularity of the relative longitude location information and the transmission value of the relative longitude location information; the relative latitude location information is equal to a product of the granularity of the relative latitude location information and the transmission value of the relative latitude location information; and the relative altitude location information is equal to a product of the granularity of the relative altitude location information and the transmission value of the relative altitude location information.

With reference to the third feasible manner, in a fourth feasible manner, the granularity of the relative longitude location information is determined by the network device, a third party, or a receiving party; the granularity of the relative latitude location information is determined by the network device, the third party, or the receiving party; and the granularity of the relative altitude location information is determined by the network device, the third party, or the receiving party.

With reference to the fourth feasible manner, in a fifth feasible manner, when the relative location information includes: the transmission value of the relative longitude location information, the transmission value of the relative latitude location information, and the transmission value of the relative altitude location information, and the granularity of the relative longitude location information, the granularity of the relative latitude location information, and the granularity of the relative altitude location information are determined by the network device, the method further includes: sending, by the network device, the granularity of the relative longitude location information, the granularity of the relative latitude location information, and the granularity of the relative altitude location information by using a broadcast channel.

With reference to the third feasible manner, in a sixth feasible manner, the granularity of the relative longitude location information, the granularity of the relative latitude location information, and the granularity of the relative altitude location information are the same.

With reference to any one of the first aspect or the first to the sixth feasible manners, in a seventh feasible manner, a manner of determining, by the network device, relative location information of the first user equipment relative to the reference point is preconfigured, and the relative location information is received from the third party, or is determined by the receiving party.

According to a second aspect, a location information obtaining method is provided. The method includes receiving, by user equipment, location information of a reference point and relative location information of first user equipment relative to the reference point. The method also includes determining, by the user equipment, location information of the first user equipment according to the location information of the reference point and the relative location information of the first user equipment relative to the reference point.

With reference to the second aspect, in a first feasible manner, the receiving, by user equipment, relative location information of first user equipment relative to the reference point includes: receiving, by the user equipment, relative location information that is of the first user equipment relative to the reference point and is sent by the first user equipment, where the relative location information of the first user equipment relative to the reference point is determined by the first user equipment according to the location information of the reference point and the location information of the first user equipment.

With reference to the second aspect, in a second feasible manner, the receiving, by user equipment, relative location information of first user equipment relative to the reference point includes: receiving, by the user equipment, relative location information that is of the first user equipment relative to the reference point and is sent by a network device, where the relative location information of the first user equipment relative to the reference point is determined by the first user equipment according to the location information of the reference point and the location information of the first user equipment and is sent to the network device.

With reference to the second aspect, in a third feasible manner, the relative location information includes at least one of relative longitude location information, relative latitude location information, or relative altitude location information.

With reference to the third feasible manner, in a fourth feasible manner, the relative location information includes: a transmission value of the relative longitude location information, a transmission value of the relative latitude location information, and a transmission value of the relative altitude location information; or a granularity of the relative longitude location information and a transmission value of the relative longitude location information, a granularity of the relative latitude location information and a transmission value of the relative latitude location information, and a granularity of the relative altitude location information and a transmission value of the relative altitude location information; where the relative longitude location information is equal to a product of the granularity of the relative longitude location information and the transmission value of the relative longitude location information; the relative latitude location information is equal to a product of the granularity of the relative latitude location information and the transmission value of the relative latitude location information; and the relative altitude location information is equal to a product of the granularity of the relative altitude location information and the transmission value of the relative altitude location information.

With reference to the fourth feasible manner, in a fifth feasible manner, the granularity of the relative longitude location information is determined by a sending party, a third party, or the user equipment; the granularity of the relative latitude location information is determined by the sending party, the third party, or the user equipment; and the granularity of the relative altitude location information is determined by the sending party, the third party, or the user equipment.

With reference to the fourth feasible manner, in a sixth feasible manner, the granularity of the relative longitude location information, the granularity of the relative latitude location information, and the granularity of the relative altitude location information are the same.

According to a third aspect, a network device is provided, The device includes an obtaining unit, configured to obtain location information of a reference point and location information of first user equipment. The device also includes a determining unit, configured to determine relative location information of the first user equipment relative to the reference point. The device also includes a sending unit, configured to send the location information of the reference point and the relative location information of the first user equipment relative to the reference point.

With reference to the third aspect, in a first feasible manner, the sending unit is specifically configured to: send the relative location information of the first user equipment relative to the reference point by using a broadcast channel.

With reference to the first feasible manner, in a second feasible manner, when the relative location information includes: a transmission value of relative longitude location information, a transmission value of relative latitude location information, and a transmission value of relative altitude location information, and a granularity of the relative longitude location information, a granularity of the relative latitude location information, and a granularity of the relative altitude location information are determined by the network device, the sending unit is further configured to send the granularity of the relative longitude location information, the granularity of the relative latitude location information, and the granularity of the relative altitude location information by using a broadcast channel, where the granularity of the relative longitude location information is determined by the network device, a third party, or a receiving party; the granularity of the relative latitude location information is determined by the network device, the third party, or the receiving party; and the granularity of the relative altitude location information is determined by the network device, the third party, or the receiving party.

According to a fourth aspect, user equipment is provided. The user equipment includes a receiving unit, configured to receive location information of a reference point and relative location information of first user equipment relative to the reference point; and The user equipment also includes a determining unit, configured to determine location information of the first user equipment according to the location information of the reference point and the relative location information of the first user equipment relative to the reference point.

With reference to the fourth aspect, in a first feasible manner, the receiving unit is specifically configured to: receive relative location information that is of the first user equipment relative to the reference point and is sent by the first user equipment, where the relative location information of the first user equipment relative to the reference point is determined by the first user equipment according to the location information of the reference point and the location information of the first user equipment.

With reference to the first feasible manner, in a second feasible manner, the receiving unit is specifically configured to: receive relative location information that is of the first user equipment relative to the reference point and is sent by a network device, where the relative location information of the first user equipment relative to the reference point is determined by the first user equipment according to the location information of the reference point and the location information of the first user equipment and is sent to the network device.

According to a fifth aspect, a network device is provided. The network device includes a processor, configured to obtain location information of a reference point and location information of first user equipment. The processor is further configured to determine relative location information of the first user equipment relative to the reference point. The network device also includes a transmitter, configured to send the location information of the reference point and the relative location information of the first user equipment relative to the reference point.

With reference to the fifth aspect, in a first feasible manner, the transmitter is specifically configured to: send the relative location information of the first user equipment relative to the reference point by using a broadcast channel.

With reference to the first feasible manner, in a second feasible manner, when the relative location information includes: a transmission value of relative longitude location information, a transmission value of relative latitude location information, and a transmission value of relative altitude location information, and a granularity of the relative longitude location information, a granularity of the relative latitude location information, and a granularity of the relative altitude location information are determined by the network device, the transmitter is further configured to send the granularity of the relative longitude location information, the granularity of the relative latitude location information, and the granularity of the relative altitude location information by using a broadcast channel, where the granularity of the relative longitude location information is determined by the network device, a third party, or a receiving party; the granularity of the relative latitude location information is determined by the network device, the third party, or the receiving party; and the granularity of the relative altitude location information is determined by the network device, the third party, or the receiving party.

According to a sixth aspect, user equipment is provided. The user equipment also includes a receiver, configured to receive location information of a reference point and relative location information of first user equipment relative to the reference point. The user equipment also includes a processor, configured to determine location information of the first user equipment according to the location information of the reference point and the relative location information of the first user equipment relative to the reference point.

With reference to the sixth aspect, in a first feasible manner, the receiver is specifically configured to: receive relative location information that is of the first user equipment relative to the reference point and is sent by the first user equipment, where the relative location information of the first user equipment relative to the reference point is determined by the first user equipment according to the location information of the reference point and the location information of the first user equipment.

With reference to the first feasible manner, in a second feasible manner, the receiver is specifically configured to: receive relative location information that is of the first user equipment relative to the reference point and is sent by a network device, where the relative location information of the first user equipment relative to the reference point is determined by the first user equipment according to the location information of the reference point and the location information of the first user equipment and is sent to the network device.

The present invention provides a location information obtaining method and the device. A network device can determine relative location information of first user equipment relative to a reference point, and then the network device sends the relative location information, so that user equipment can receive the relative location information, which ensures that the user equipment can determine an actual location of the first user equipment.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to various communications systems, for example, a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), or a Worldwide Interoperability for Microwave Access (WiMAX) communications system.

It should be understood that in the embodiments of the present invention, user equipment (UE) includes but is not limited to a mobile station (MS), a mobile terminal, a mobile telephone, a handset, portable equipment, and the like. The user equipment may communicate with one or more core networks by using a radio access network (RAN). For example, the user equipment may be a mobile telephone (or referred to as a "cellular" phone), or a computer with a wireless communication function, or the user equipment may be a portable, pocket-sized, handheld, computer built-in, or in-vehicle mobile apparatus.

In the embodiments of the present invention, a network device may be a base transceiver station (BTS) in GSM or CDMA, or may be a NodeB in WCDMA, or may be an evolved NodeB (eNB or e-NodeB) in LTE, which is not limited in the present invention.

D2D is a new technology that allows, under control of a system, direct communication between terminals by reusing cell resources, which can increase spectrum efficiency of a cellular communications system, reduce transmit power of the terminals, and resolve a problem of spectrum resource shortage in a wireless communications system to some extent. In D2D, resources are shared between cell users under control of a cell network, and therefore, spectrum utilization is improved. In addition, benefits further brought by D2D include: reducing a burden of a cellular network, reducing battery consumption of a mobile terminal, increasing a bit rate, improving fault robustness of a network infrastructure, and the like. D2D can further support a new small-range point-to-point data service.

Embodiment 1

Figure 1:
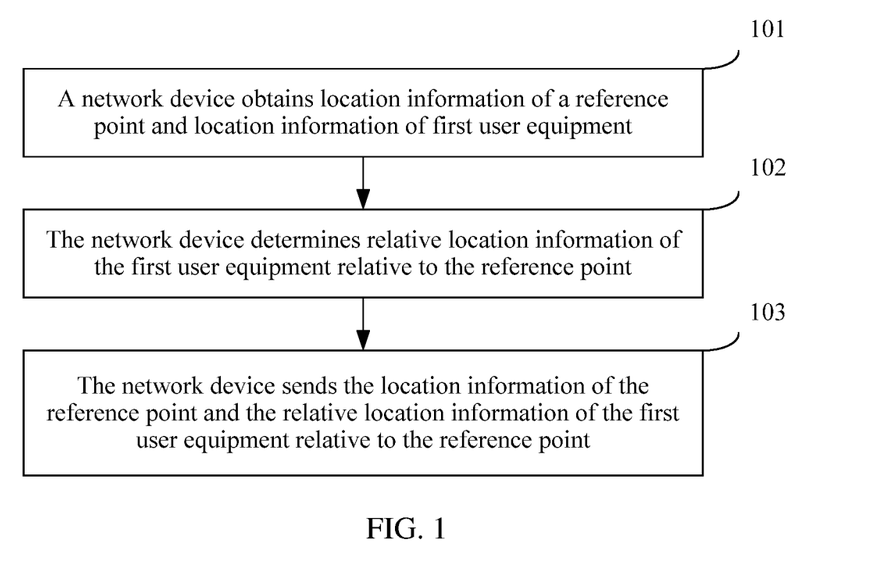
FIG. 1 is a flowchart of a location information obtaining method according to an embodiment of the present invention.

This embodiment of the present invention provides a location information obtaining method, which is applied to a D2D system. The system includes a network device and user equipment, the network device may directly communicate with the user equipment, and user equipments may directly communicate with each other. As shown in FIG. 1, the method may include the following steps.

Step 101: The network device obtains location information of a reference point and location information of first user equipment.

Step 102: The network device determines relative location information of the first user equipment relative to the reference point.

Step 103: The network device sends the location information of the reference point and the relative location information of the first user equipment relative to the reference point.

In this way, a network device can determine relative location information of first user equipment relative to a reference point, and then the network device sends the relative location information, so that user equipment can receive the relative location information, which ensures that the user equipment can determine an actual location of the first user equipment.

Specifically, step 102 may include: sending, by the network device, the relative location information of the first user equipment relative to the reference point by using a broadcast channel.

Further, the relative location information may not mandatorily include relative longitude location information, relative latitude location information, or relative altitude location information, or may include at least one thereof. For example, the relative location information includes only the relative longitude location information and the relative latitude location information. The relative longitude location information indicates a difference between a longitude of the user equipment and a longitude of the reference point, the relative latitude location information indicates a difference between a latitude of the user equipment and a latitude of the reference point, and the relative altitude location information indicates a difference between an altitude of the user equipment and an altitude of the reference point.

Further, the relative location information includes: a transmission value of the relative longitude location information, a transmission value of the relative latitude location information, and a transmission value of the relative altitude location information; or a granularity of the relative longitude location information and a transmission value of the relative longitude location information, a granularity of the relative latitude location information and a transmission value of the relative latitude location information, and a granularity of the relative altitude location information and a transmission value of the relative altitude location information.

The relative longitude location information is equal to a product of the granularity of the relative longitude location information and the transmission value of the relative longitude location information; the relative latitude location information is equal to a product of the granularity of the relative latitude location information and the transmission value of the relative latitude location information; and the relative altitude location information is equal to a product of the granularity of the relative altitude location information and the transmission value of the relative altitude location information.

Further, the foregoing granularity of the relative longitude location information is determined by the network device, a third party, or a receiving party; the foregoing granularity of the relative latitude location information is determined by the network device, the third party, or the receiving party; and the foregoing granularity of the relative altitude location information is determined by the network device, the third party, or the receiving party.

Further, when the relative location information includes: the transmission value of the relative longitude location information, the transmission value of the relative latitude location information, and the transmission value of the relative altitude location information, and the granularity of the relative longitude location information, the granularity of the relative latitude location information, and the granularity of the relative altitude location information are determined by the network device, the method further includes: sending, by the network device, the granularity of the relative longitude location information, the granularity of the relative latitude location information, and the granularity of the relative altitude location information by using a broadcast channel.

For ease of calculation, preferably, the granularity of the relative longitude location information, the granularity of the relative latitude location information, and the granularity of the relative altitude location information are the same in this embodiment.

Further, a manner in which the network device determines the relative location information of the first user equipment relative to the reference point is preconfigured, and the relative location information is received from the third party, or is determined by the receiving party.

Embodiment 2

Figure 2:
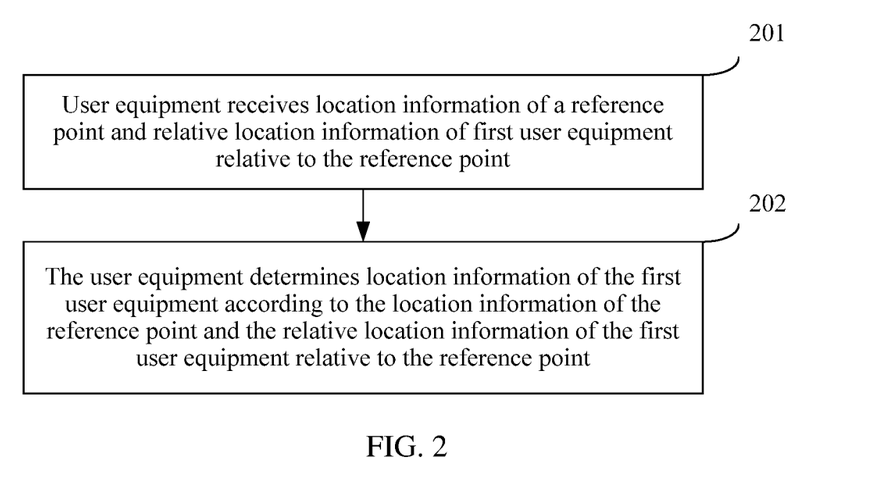
FIG. 2 is a flowchart of another location information obtaining method according to an embodiment of the present invention.

This embodiment of the present invention provides a location information obtaining method, which is applied to a D2D system. The system includes a network device and user equipment, the network device may directly communicate with the user equipment, and user equipments may directly communicate with each other. As shown in FIG. 2, the method may include the following steps.

Step 201: The user equipment receives location information of a reference point and relative location information of first user equipment relative to the reference point.

Step 202: The user equipment determines location information of the first user equipment according to the location information of the reference point and the relative location information of the first user equipment relative to the reference point.

In this way, after receiving location information of a reference point and relative location information of first user equipment relative to the reference point, user equipment determines location information of the first user equipment according to the location information of the reference point and the relative location information of the first user equipment relative to the reference point, which ensures that the user equipment can determine an actual location of the first user equipment.

Because sending parties of the relative location information are different, step 201 changes accordingly.

Optionally, when the sending party is the first user equipment, step 201 may specifically include: receiving, by the user equipment, relative location information that is of the first user equipment relative to the reference point information and is sent by the first user equipment, where the relative location information of the first user equipment relative to the reference point is determined by the first user equipment according to the location information of the reference point and the location information of the first user equipment.

Optionally, when the sending party is the network device, step 201 may specifically include: receiving, by the user equipment, relative location information that is of the first user equipment relative to the reference point and is sent by the network device, where the relative location information of the first user equipment relative to the reference point is determined by the first user equipment according to the location information of the reference point and the location information of the first user equipment and is sent to the network device.

Further, the location information may include at least one of a longitude, a latitude, or an altitude, and the relative location information may not mandatorily include relative longitude location information, relative latitude location information, or relative altitude location information, or may include at least one thereof. For example, the relative location information includes only the relative longitude location information and the relative latitude location information. The relative longitude location information indicates a difference between a longitude of the user equipment and a longitude of the reference point, the relative latitude location information indicates a difference between a latitude of the user equipment and a latitude of the reference point, and the relative altitude location information indicates a difference between an altitude of the user equipment and an altitude of the reference point.

The relative location information may be constituted of two types of content in this embodiment.

Optionally, the relative location information includes: a transmission value of the relative longitude location information, a transmission value of the relative latitude location information, and a transmission value of the relative altitude location information. The relative longitude location information is equal to a product of a granularity of the relative longitude location information and the transmission value of the relative longitude location information; the relative latitude location information is equal to a product of a granularity of the relative latitude location information and the transmission value of the relative latitude location information; and the relative altitude location information is equal to a product of a granularity of the relative altitude location information and the transmission value of the relative altitude location information.

Optionally, the relative location information includes: a granularity of the relative longitude location information and a transmission value of the relative longitude location information, a granularity of the relative latitude location information and a transmission value of the relative latitude location information, and a granularity of the relative altitude location information and a transmission value of the relative altitude location information. The relative longitude location information is equal to a product of the granularity of the relative longitude location information and the transmission value of the relative longitude location information; the relative latitude location information is equal to a product of the granularity of the relative latitude location information and the transmission value of the relative latitude location information; and the relative altitude location information is equal to a product of the granularity of the relative altitude location information and the transmission value of the relative altitude location information.

Further, the foregoing granularity of the relative longitude location information is determined by a sending party, a third party, or the user equipment; the foregoing granularity of the relative latitude location information is determined by the sending party, the third party, or the user equipment; and the foregoing granularity of the relative altitude location information is determined by the sending party, the third party, or the user equipment.

Preferably, the foregoing granularity of the relative longitude location information, the foregoing granularity of the relative latitude location information, and the foregoing granularity of the relative altitude location information are the same.

Embodiment 3

Figure 3:
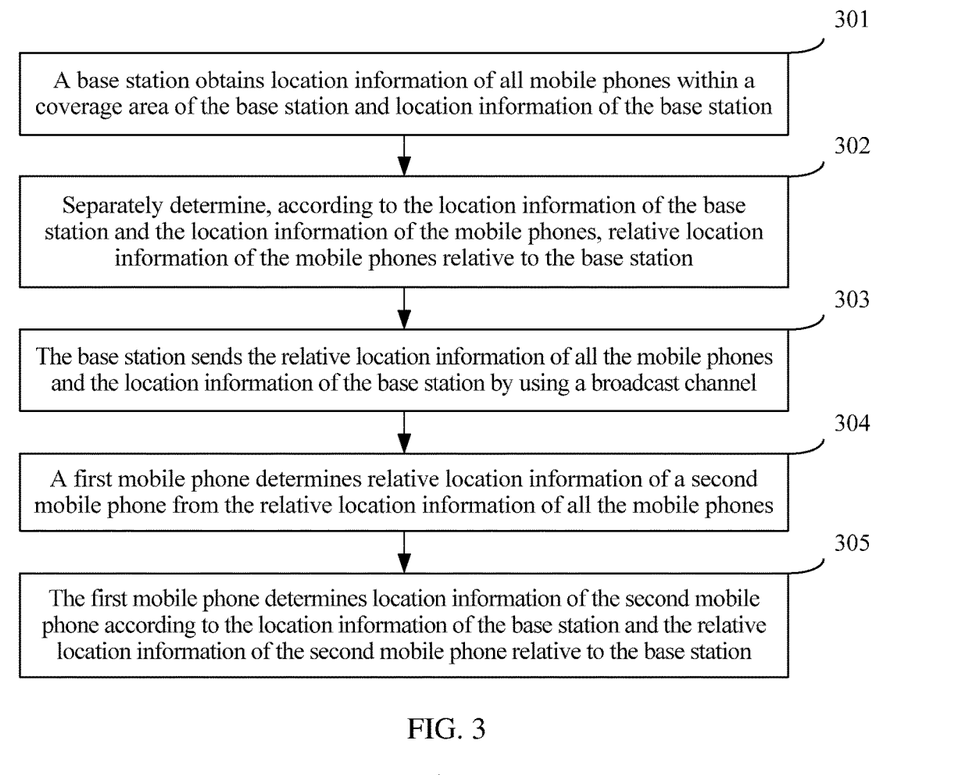
FIG. 3 is a flowchart of still another location information obtaining method according to an embodiment of the present invention.

This embodiment of the present invention provides a location information obtaining method, which is applied to a D2D communications system. The system may include user equipment and a network device. In an example of this embodiment, the user equipment is a mobile phone, and the network device is a base station. It is assumed that a reference point is a base station in this embodiment of the present invention. As shown in FIG. 3, the method may include the following steps.

Step 301: The base station obtains location information of all mobile phones within a coverage area of the base station and location information of the base station.

The location information of the mobile phone is used to indicate a location of the mobile phone, and may include a longitude, a latitude, and an altitude of the mobile phone. The location information of the base station indicates a location of the base station, and may include a longitude, a latitude, and an altitude of the base station.

Step 302: The base station separately determines, according to the location information of the base station and the location information of the mobile phones, relative location information of the mobile phones relative to the base station.

The relative location information includes: a transmission value of relative longitude location information of the mobile phone, a transmission value of relative latitude location information of the mobile phone, and a transmission value of relative altitude location information of the mobile phone; or the relative location information includes:

a transmission value of relative longitude location information of the mobile phone, a transmission value of relative latitude location information of the mobile phone, a transmission value of relative altitude location information of the mobile phone, and granularity information of the mobile phone. The granularity information may include: a granularity of the relative longitude location information, a granularity of the relative latitude location information, and a granularity of the relative altitude location information. It should be noted that granularity information of the mobile phones may be the same, or may be different.

The foregoing transmission value of the relative longitude location information of the mobile phone is equal to a value obtained by dividing the relative longitude location information of the mobile phone by the granularity of the relative longitude location information of the mobile phone; the foregoing transmission value of the relative latitude location information of the mobile phone is equal to a value obtained by dividing the relative latitude location information of the mobile phone by the granularity of the relative latitude location information of the mobile phone; and the foregoing transmission value of the relative altitude location information of the mobile phone is equal to a value obtained by dividing the relative altitude location information of the mobile phone by the granularity of the relative altitude location information of the mobile phone.

Before the transmission value is calculated, the base station further needs to determine the granularity information of the mobile phone, or receive preset granularity information sent by a third party or the mobile phone.

The foregoing relative longitude location information of the mobile phone is a difference between the longitude of the mobile phone and the longitude of the base station, the foregoing relative latitude location information of the mobile phone is a difference between the latitude of the mobile phone and the latitude of the base station, and the foregoing relative altitude location information of the mobile phone is a difference between the altitude of the mobile phone and the altitude of the base station.

A mobile phone is used as an example in this embodiment to describe step 302 in detail. Location information of the mobile phone includes: a longitude x of the mobile phone, a latitude y of the mobile phone, and an altitude z of the mobile phone. The location information of the base station includes: a longitude a of the base station, a latitude b of the base station, and an altitude c of the base station.

The base station performs a subtractive operation on x and a, performs a subtractive operation on y and b, and performs a subtractive operation on z and c, to obtain relative longitude location information x−a of the mobile phone, relative latitude location information y−b of the mobile phone, and relative altitude location information z−c of the mobile phone. Then, the base station divides all the relative location information by respectively corresponding granularities: a granularity m of the relative longitude location information, a granularity n of the relative latitude location information, and a granularity o of the relative altitude location information, to obtain a transmission value (x−a)/m of the relative longitude location information of the mobile phone, a transmission value (y−b)/n of the relative latitude location information of the mobile phone, and a transmission value (z−c)/o of the relative altitude location information of the mobile phone.

Figure 4:
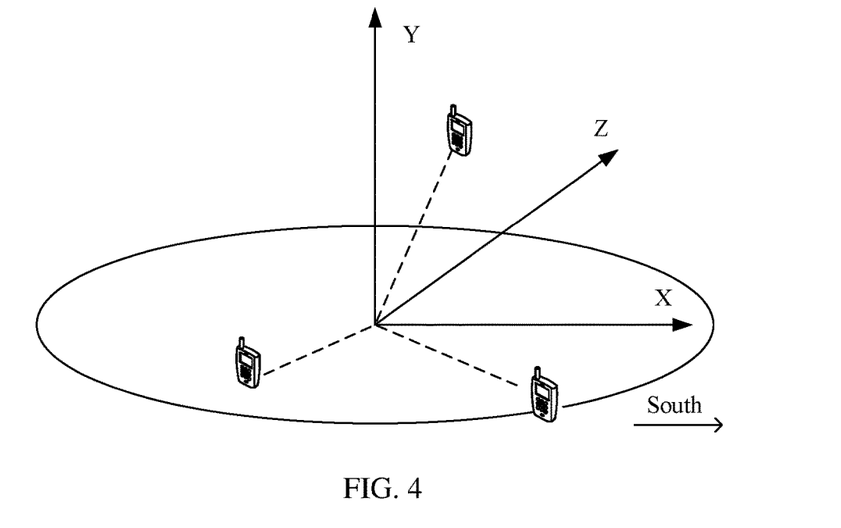
FIG. 4 is a schematic diagram of a Cartesian coordinate system using a base station as an origin of coordinates.

FIG. 4 shows a Cartesian coordinate system using a location of a base station as an origin of coordinates. A positive direction of an X axis indicates the south of the base station, and a negative direction of the X axis indicates the north of the base station. A positive direction of a Y axis indicates the east of the base station, and a negative direction of the Y axis indicates the west of the base station. A positive direction of a Z axis indicates an altitude higher than that of the base station, and a negative direction of the Z axis indicates an altitude lower than that of the base station. Therefore, a positive or negative value that is of the relative location information of the mobile phone and is obtained through calculation indicates a direction of the mobile phone relative to the base station.

It should be noted that directions corresponding to a coordinate axis in this embodiment are not limited thereto, and the coordinate system is not limited to the Cartesian coordinate system, which may be a cylindrical coordinate system, a spherical coordinate system, or the like. The granularities m, n, and o in this embodiment may be a same real number, or may be different real numbers. The reference point in this embodiment is not limited to the base station, and any object in a fixed location may be used as a reference point.

Step 303: The base station sends the relative location information of all the mobile phones and the location information of the base station by using a broadcast channel.

When the granularity information is determined by the base station, the base station further needs to send the granularity information by using the broadcast channel. The granularity information includes the granularity of the relative longitude location information, the granularity of the relative latitude location information, and the granularity of the relative altitude location information. It should be noted that an identifier of the mobile phone may also be sent by using the broadcast channel.

Step 304: A first mobile phone obtains relative location information of a second mobile phone from the broadcast channel.

The first mobile phone is one of all the mobile phones within the coverage area of the base station, and the second mobile phone is a mobile phone within the coverage area of the base station except the first mobile phone.

Step 305: The first mobile phone determines location information of the second mobile phone according to the location information of the base station and the relative location information of the second mobile phone relative to the base station.

The location information of the second mobile phone includes a longitude, a latitude, and an altitude of the second mobile phone.

Exemplarily, it is assumed that, in the relative location information of the second mobile phone, a transmission value of relative longitude location information of the second mobile phone, a transmission value of relative latitude location information of the second mobile phone, and a transmission value of relative altitude location information of the second mobile phone are (x'−a)/m, (y'−b)/n, and (z'−c)/o respectively, (x'−a)/m, (y'−b)/n, and (z'−c)/o are multiplied by a corresponding granularity m of the relative longitude location information, a corresponding granularity n of the relative latitude location information, and a corresponding granularity o of the relative altitude location information, to obtain the relative longitude location information x'−a of the second mobile phone, the relative latitude location information y'−b of the second mobile phone, and the relative altitude location information z'−c of the second mobile phone; then, the longitude a of the base station, the latitude b of the base station, and the altitude c of the base station are respectively added to x'−a, y'−b, and z'−c, to obtain the longitude x' of the second mobile phone, the latitude y' of the second mobile phone, and the altitude z' of the second mobile phone.

In this embodiment, relative location information is sent instead of location information, which aims to replace, with a differential value having a relatively low order of magnitude, those values having a relatively high order of magnitude such as a longitude, a latitude, and an altitude for transmission and storage. If it is assumed that a longitude of a reference point is 100, a longitude of a mobile phone is 125, and a granularity of relative longitude location information is 5, relative longitude location information is 5. Obviously, 5 can be indicated by using only a three-bit binary code, but 125 can be indicated only by using a nine-bit binary code. Obviously, space occupied by the relative location information is less than that occupied by the location information. Likewise, in an actual test, resources (about 30 bits) occupied by the relative location information is obviously less than those (about 60 to 70 bits) occupied by the location information. Therefore, resources of a base station and user equipment are greatly saved.

Embodiment 4

Figure 5:
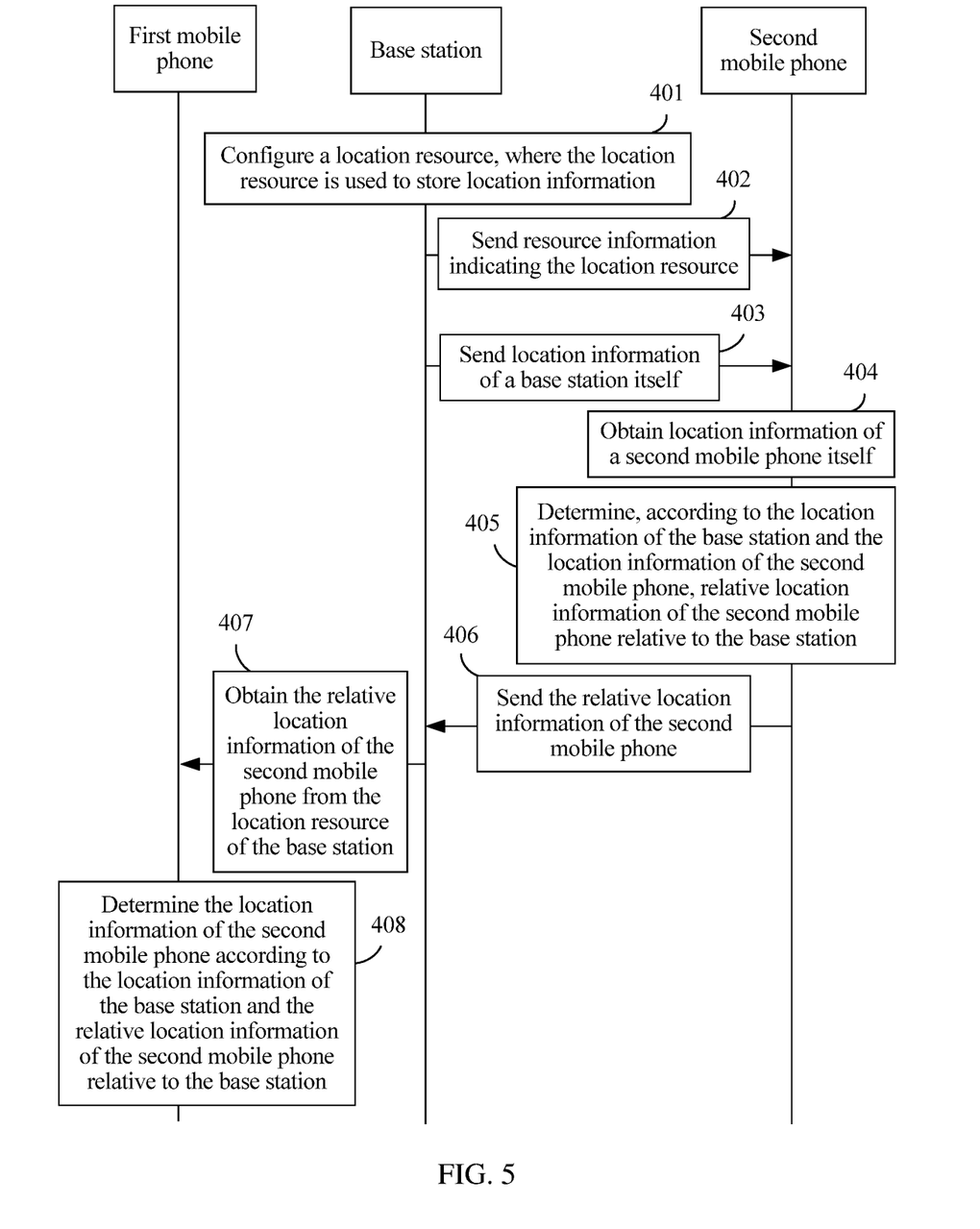
FIG. 5 is a flowchart of yet another location information obtaining method according to an embodiment of the present invention.

This embodiment of the present invention provides a location information obtaining method, which is applied to a D2D communications system. The system may include user equipment and a network device. In an example of this embodiment, the user equipment is a mobile phone, and the network device is a base station. It is assumed that a reference point is a base station in this embodiment of the present invention. As shown in FIG. 5, the method may include the following steps.

Step 401: The base station configures a location resource, where the location resource is used to store location information.

Step 402: The base station sends resource information indicating the location resource.

Step 403: The base station sends location information of the base station itself.

Step 404: A second mobile phone obtains location information of the second mobile phone itself.

Figure 6:
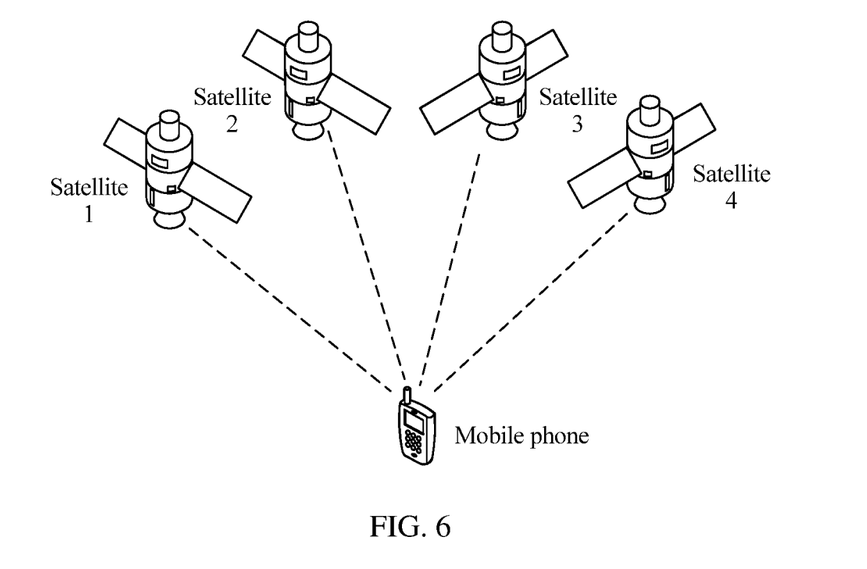
FIG. 6 is a schematic diagram of a location of a mobile phone and a location of a satellite in GPS positioning in the prior art.

In this embodiment, the location information is obtained by using multiple methods, for example, GPS positioning and base station positioning. The GPS positioning is used as an example in this embodiment. Specifically, as shown in FIG. 6, the GPS positioning is to determine a location of a GPS receiver by using four satellites whose locations are already known. Actual location information of the second mobile phone is obtained through calculation by using actual locations at which the four satellites are located and distances from the four satellites to the second mobile phone.

Step 405: The second mobile phone determines, according to the location information of the base station and the location information of the second mobile phone, relative location information of the second mobile phone relative to the base station.

The relative location information includes: a transmission value of relative longitude location information of the second mobile phone, a transmission value of relative latitude location information of the second mobile phone, and a transmission value of relative altitude location information of the second mobile phone; or the relative location information includes: a transmission value of relative longitude location information of the second mobile phone, a transmission value of relative latitude location information of the second mobile phone, a transmission value of relative altitude location information of the second mobile phone, and granularity information of the second mobile phone. The granularity information may include: a granularity of the relative longitude location information, a granularity of the relative latitude location information, and a granularity of the relative altitude location information. It should be noted that granularity information of second mobile phones may be the same, or may be different.

The transmission value of the relative longitude location information of the second mobile phone is equal to a value obtained by dividing the relative longitude location information of the second mobile phone by the granularity of the relative longitude location information of the second mobile phone; the transmission value of the relative latitude location information of the second mobile phone is equal to a value obtained by dividing the relative latitude location information of the second mobile phone by the granularity of the relative latitude location information of the second mobile phone; and the transmission value of the relative altitude location information of the second mobile phone is equal to a value obtained by dividing the relative altitude location information of the second mobile phone by the granularity of the relative altitude location information of the second mobile phone.

The relative longitude location information of the second mobile phone is a difference between a longitude of the second mobile phone and a longitude of the base station, the relative latitude location information of the second mobile phone is a difference between a latitude of the second mobile phone and a latitude of the base station, and the relative altitude location information of the second mobile phone is a difference between an altitude of the second mobile phone and an altitude of the base station.

Before the foregoing transmission value is calculated, the second mobile phone further needs to determine the granularity information of the second mobile phone itself, or receive preset granularity information sent by a third party or the base station. The granularity information of the second mobile phone may include the granularity of the relative longitude location information, the granularity of the relative latitude location information, and the granularity of the relative altitude location information. Granularity information of mobile phones may be the same, or may be different.

A method for determining the relative location information is the same as the method in step 302 in Embodiment 3, and is executed by the second mobile phone instead of the base station. Details are not described herein again.

Step 406: The second mobile phone sends the relative location information of the second mobile phone to the location resource indicated by the resource information.

The relative location information includes: the transmission value of the relative longitude location information of the second mobile phone, the transmission value of the relative latitude location information of the second mobile phone, and the transmission value of the relative altitude location information of the second mobile phone; or the relative location information includes: the transmission value of the relative longitude location information of the second mobile phone, the transmission value of the relative latitude location information of the second mobile phone, the transmission value of the relative altitude location information of the second mobile phone, and the granularity information of the second mobile phone. The granularity information may include: the granularity of the relative longitude location information, the granularity of the relative latitude location information, and the granularity of the relative altitude location information.

Step 407: A first mobile phone obtains the relative location information of the second mobile phone from the location resource of the base station.

Step 408: The first mobile phone determines the location information of the second mobile phone according to the location information of the base station and the relative location information of the second mobile phone relative to the base station.

The location information of the second mobile phone includes the longitude, the latitude, and the altitude of the second mobile phone.

A method for determining the location information of the second mobile phone by the first mobile phone is the same as the method in step 305 in Embodiment 3. Details are not described herein again.

It should be noted that in addition to obtaining the relative location information of the second mobile phone relative to the base station from the base station in the foregoing step 406 and step 407, the relative location information may be sent by the second mobile phone, and the relative location information is received by the first mobile phone, which is not limited in this embodiment.

In this embodiment, relative location information is sent instead of location information, which aims to replace, with a differential value having a relatively low order of magnitude, those values having a relatively high order of magnitude such as a longitude, a latitude, and an altitude for transmission and storage. If it is assumed that a longitude of a reference point is 100, a longitude of a mobile phone is 125, and a granularity of relative longitude location information is 5, relative longitude location information is 5. Obviously, 5 can be indicated by using only a three-bit binary code, but 125 can be indicated only by using a nine-bit binary code. Obviously, space occupied by the relative location information is less than that occupied by the location information. Likewise, in an actual test, resources (about 30 bits) occupied by the relative location information is obviously less than those (about 60 to 70 bits) occupied by the location information. Therefore, resources of a base station and user equipment are greatly saved.

Embodiment 5

Figure 7:
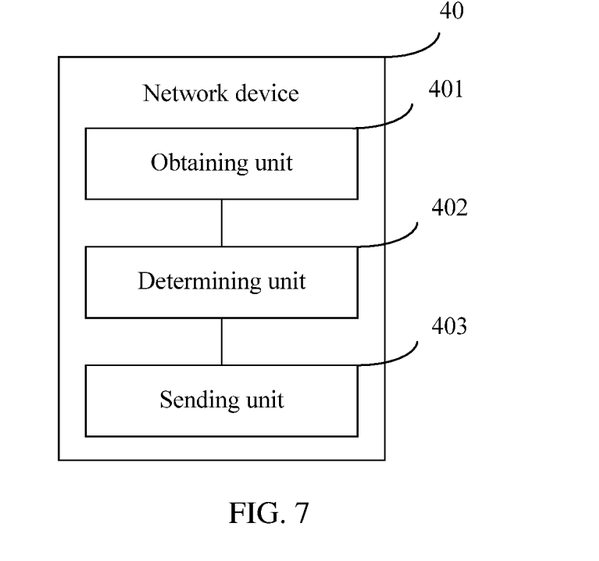
FIG. 7 is a schematic structural diagram of a network device according to an embodiment of the present invention.

This embodiment of the present invention provides a network device 50. As shown in FIG. 7, the network device 50 may include: an obtaining unit 501, configured to obtain location information of a reference point and location information of first user equipment; a determining unit 502, configured to determine relative location information of the first user equipment relative to the reference point; and a sending unit 503, configured to send the location information of the reference point and the relative location information of the first user equipment relative to the reference point.

In this way, a network device can determine relative location information of first user equipment relative to a reference point, and then the network device sends the relative location information, so that user equipment can receive the relative location information, which ensures that the user equipment can determine an actual location of the first user equipment.

Further, the sending unit 503 is specifically configured to send the relative location information of the first user equipment relative to the reference point by using a broadcast channel.

Further, the relative location information includes at least one of relative longitude location information, relative latitude location information, or relative altitude location information.

Optionally, the relative location information includes: a transmission value of the relative longitude location information, a transmission value of the relative latitude location information, and a transmission value of the relative altitude location information. The relative longitude location information is equal to a product of a granularity of the relative longitude location information and the transmission value of the relative longitude location information; the relative latitude location information is equal to a product of a granularity of the relative latitude location information and the transmission value of the relative latitude location information; and the relative altitude location information is equal to a product of a granularity of the relative altitude location information and the transmission value of the relative altitude location information.

Optionally, the relative location information includes: a granularity of the relative longitude location information and a transmission value of the relative longitude location information, a granularity of the relative latitude location information and a transmission value of the relative latitude location information, and a granularity of the relative altitude location information and a transmission value of the relative altitude location information. The relative longitude location information is equal to a product of the granularity of the relative longitude location information and the transmission value of the relative longitude location information; the relative latitude location information is equal to a product of the granularity of the relative latitude location information and the transmission value of the relative latitude location information; and the relative altitude location information is equal to a product of the granularity of the relative altitude location information and the transmission value of the relative altitude location information.

Further, the granularity of the relative longitude location information is determined by the network device, a third party, or a receiving party; the granularity of the relative latitude location information is determined by the network device, the third party, or the receiving party; and the granularity of the relative altitude location information is determined by the network device, the third party, or the receiving party.

Further, when the relative location information includes: the transmission value of the relative longitude location information, the transmission value of the relative latitude location information, and the transmission value of the relative altitude location information, and the granularity of the relative longitude location information, the granularity of the relative latitude location information, and the granularity of the relative altitude location information are determined by the network device, the sending unit 503 is further configured to send the granularity of the relative longitude location information, the granularity of the relative latitude location information, and the granularity of the relative altitude location information by using a broadcast channel.

Preferably, the foregoing granularity of the relative longitude location information, the foregoing granularity of the relative latitude location information, and the foregoing granularity of the relative altitude location information are the same.

Further, a manner in which the network device determines the relative location information of the first user equipment relative to the reference point is preconfigured, and the relative location information is received from the third party, or is determined by the receiving party.

Embodiment 6

Figure 8:
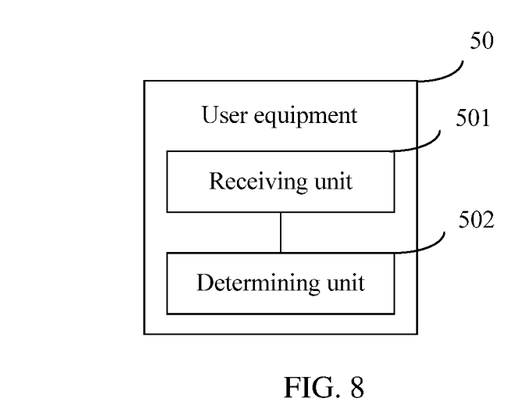
FIG. 8 is a schematic structural diagram of user equipment according to an embodiment of the present invention.

This embodiment of the present invention provides user equipment 60. As shown in FIG. 8, the user equipment 60 may include: a receiving unit 601, configured to receive location information of a reference point and relative location information of first user equipment relative to the reference point; and a determining unit 602, configured to determine location information of the first user equipment according to the location information of the reference point and the relative location information of the first user equipment relative to the reference point.

In this way, after receiving location information of a reference point and relative location information of first user equipment relative to the reference point, user equipment determines location information of the first user equipment according to the location information of the reference point and the relative location information of the first user equipment relative to the reference point, which ensures that the user equipment can determine an actual location of the first user equipment.

Optionally, the receiving unit 601 is specifically configured to receive relative location information that is of the first user equipment relative to the reference point and is sent by the first user equipment, where the relative location information of the first user equipment relative to the reference point is determined by the first user equipment according to the location information of the reference point and the location information of the first user equipment.

Optionally, the receiving unit 601 is specifically configured to receive relative location information that is of the first user equipment relative to the reference point and is sent by a network device, where the relative location information of the first user equipment relative to the reference point is determined by the first user equipment according to the location information of the reference point and the location information of the first user equipment and is sent to the network device.

Further, the relative location information includes at least one of relative longitude location information, relative latitude location information, or relative altitude location information.

Optionally, the relative location information includes: a transmission value of the relative longitude location information, a transmission value of the relative latitude location information, and a transmission value of the relative altitude location information. The relative longitude location information is equal to a product of a granularity of the relative longitude location information and the transmission value of the relative longitude location information; the relative latitude location information is equal to a product of a granularity of the relative latitude location information and the transmission value of the relative latitude location information; and the relative altitude location information is equal to a product of a granularity of the relative altitude location information and the transmission value of the relative altitude location information.

Optionally, the relative location information includes: a granularity of the relative longitude location information and a transmission value of the relative longitude location information, a granularity of the relative latitude location information and a transmission value of the relative latitude location information, and a granularity of the relative altitude location information and a transmission value of the relative altitude location information. The relative longitude location information is equal to a product of the granularity of the relative longitude location information and the transmission value of the relative longitude location information; the relative latitude location information is equal to a product of the granularity of the relative latitude location information and the transmission value of the relative latitude location information; and the relative altitude location information is equal to a product of the granularity of the relative altitude location information and the transmission value of the relative altitude location information.

Further, the granularity of the relative longitude location information is determined by a sending party, a third party, or the user equipment; the granularity of the relative latitude location information is determined by the sending party, the third party, or the user equipment; and the granularity of the relative altitude location information is determined by the sending party, the third party, or the user equipment.

Preferably, the granularity of the relative longitude location information, the granularity of the relative latitude location information, and the granularity of the relative altitude location information are the same.

Embodiment 7

Figure 9:
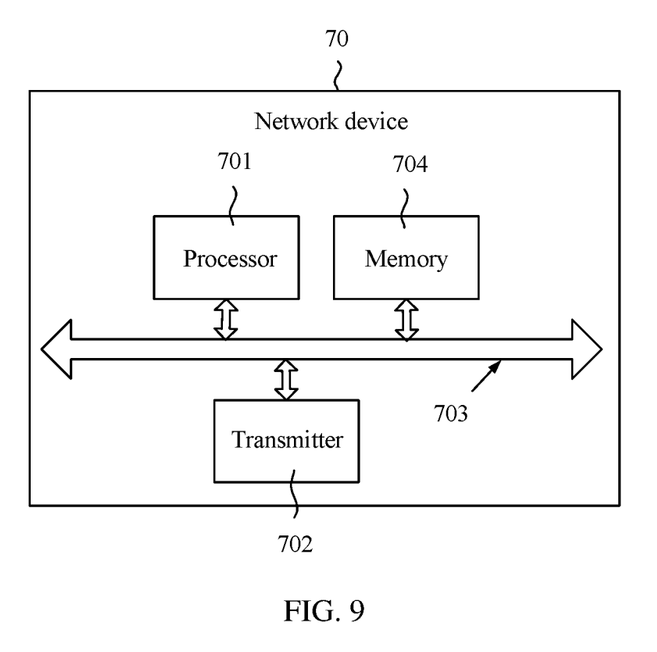
FIG. 9 is a schematic structural diagram of another network device according to an embodiment of the present invention.

This embodiment of the present invention provides a network device 70. As shown in FIG. 9, the network device 70 may include: a processor 701, a transmitter 702, a memory 704, and one or several communications buses 703 used for connection between devices inside the network device 70, which are configured to implement connection and mutual communication between these devices.

The communications bus 703 may be an industry standard architecture (ISA) bus, a peripheral component interconnect (PCI) bus, an extended industry standard architecture (EISA) bus, or the like. The bus 703 may be classified into an address bus, a data bus, a control bus, and the like.

The memory 704 may include a read-only memory and a random access memory, and is configured to store program code.

The processor 701 is configured to obtain location information of a reference point and location information of first user equipment.

The processor 701 is further configured to determine relative location information of the first user equipment relative to the reference point.

The transmitter 702 is configured to send the location information of the reference point and the relative location information of the first user equipment relative to the reference point.

In this way, a network device can determine relative location information of first user equipment relative to a reference point, and then the network device sends the relative location information, so that user equipment can receive the relative location information, which ensures that the user equipment can determine an actual location of the first user equipment.

Further, the transmitter 702 is specifically configured to send the relative location information of the first user equipment relative to the reference point by using a broadcast channel.

Further, the relative location information includes at least one of relative longitude location information, relative latitude location information, or relative altitude location information.

Optionally, the relative location information includes: a transmission value of the relative longitude location information, a transmission value of the relative latitude location information, and a transmission value of the relative altitude location information. The relative longitude location information is equal to a product of a granularity of the relative longitude location information and the transmission value of the relative longitude location information; the relative latitude location information is equal to a product of a granularity of the relative latitude location information and the transmission value of the relative latitude location information; and the relative altitude location information is equal to a product of a granularity of the relative altitude location information and the transmission value of the relative altitude location information.

Optionally, the relative location information includes: a granularity of the relative longitude location information and a transmission value of the relative longitude location information, a granularity of the relative latitude location information and a transmission value of the relative latitude location information, and a granularity of the relative altitude location information and a transmission value of the relative altitude location information. The relative longitude location information is equal to a product of the granularity of the relative longitude location information and the transmission value of the relative longitude location information; the relative latitude location information is equal to a product of the granularity of the relative latitude location information and the transmission value of the relative latitude location information; and the relative altitude location information is equal to a product of the granularity of the relative altitude location information and the transmission value of the relative altitude location information.

Further, the granularity of the relative longitude location information is determined by the network device, a third party, or a receiving party; the granularity of the relative latitude location information is determined by the network device, the third party, or the receiving party; and the granularity of the relative altitude location information is determined by the network device, the third party, or the receiving party.

Further, when the relative location information includes: the transmission value of the relative longitude location information, the transmission value of the relative latitude location information, and the transmission value of the relative altitude location information, and the granularity of the relative longitude location information, the granularity of the relative latitude location information, and the granularity of the relative altitude location information are determined by the network device, the transmitter 702 is further configured to send the granularity of the relative longitude location information, the granularity of the relative latitude location information, and the granularity of the relative altitude location information by using a broadcast channel.

Further, the granularity of the relative longitude location information, the granularity of the relative latitude location information, and the granularity of the relative altitude location information are the same.

Further, a manner in which the network device determines the relative location information of the first user equipment relative to the reference point is preconfigured, and the relative location information is received from the third party, or is determined by the receiving party.

Embodiment 8

Figure 10:
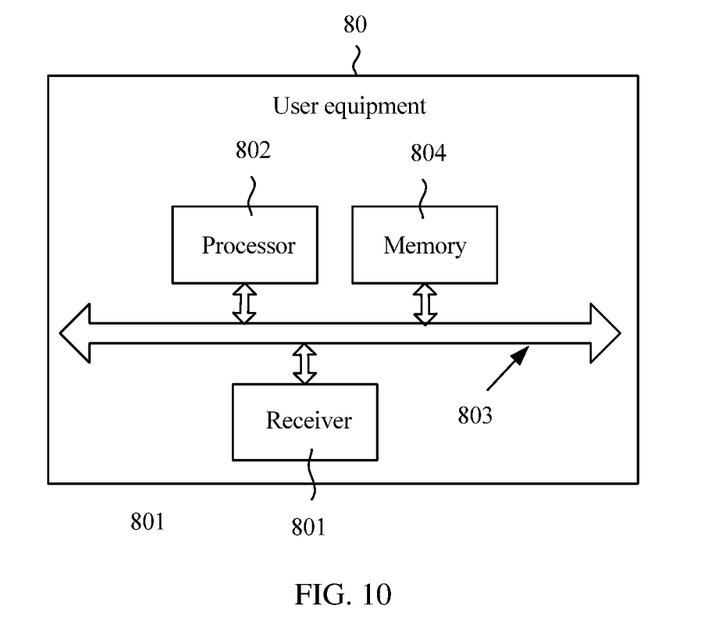
FIG. 10 is a schematic structural diagram of another user equipment according to an embodiment of the present invention.

This embodiment of the present invention provides user equipment 80. As shown in FIG. 10, the user equipment 80 may include: a receiver 801, a processor 802, a memory 804, and one or several communications buses 803 used for connection between devices inside the user equipment 80, which are configured to implement connection and mutual communication between these devices.

The communications bus 803 may be an industry standard architecture (ISA for short) bus, a peripheral component interconnect (PCI for short) bus, an extended industry standard architecture (EISA for short) bus, or the like. The bus 803 may be classified into an address bus, a data bus, a control bus, and the like.

The memory 804 may include a read-only memory and a random access memory, and is configured to store program code.

The receiver 801 is configured to receive location information of a reference point and relative location information of first user equipment relative to the reference point.

The processor 802 is configured to determine location information of the first user equipment according to the location information of the reference point and the relative location information of the first user equipment relative to the reference point.

In this way, after receiving location information of a reference point and relative location information of first user equipment relative to the reference point, user equipment determines location information of the first user equipment according to the location information of the reference point and the relative location information of the first user equipment relative to the reference point, which ensures that the user equipment can determine an actual location of the first user equipment.

Optionally, the receiver 801 is specifically configured to: receive relative location information that is of the first user equipment relative to the reference point and is sent by the first user equipment, where the relative location information of the first user equipment relative to the reference point is determined by the first user equipment according to the location information of the reference point and the location information of the first user equipment.

Optionally, the receiver 801 is specifically configured to: receive relative location information that is of the first user equipment relative to the reference point and is sent by a network device, where the relative location information of the first user equipment relative to the reference point is determined by the first user equipment according to the location information of the reference point and the location information of the first user equipment and is sent to the network device.

Further, the relative location information includes at least one of relative longitude location information, relative latitude location information, or relative altitude location information.

Optionally, the relative location information includes: a transmission value of the relative longitude location information, a transmission value of the relative latitude location information, and a transmission value of the relative altitude location information. The relative longitude location information is equal to a product of a granularity of the relative longitude location information and the transmission value of the relative longitude location information; the relative latitude location information is equal to a product of a granularity of the relative latitude location information and the transmission value of the relative latitude location information; and the relative altitude location information is equal to a product of a granularity of the relative altitude location information and the transmission value of the relative altitude location information.

Optionally, the relative location information includes: a granularity of the relative longitude location information and a transmission value of the relative longitude location information, a granularity of the relative latitude location information and a transmission value of the relative latitude location information, and a granularity of the relative altitude location information and a transmission value of the relative altitude location information. The relative longitude location information is equal to a product of the granularity of the relative longitude location information and the transmission value of the relative longitude location information; the relative latitude location information is equal to a product of the granularity of the relative latitude location information and the transmission value of the relative latitude location information; and the relative altitude location information is equal to a product of the granularity of the relative altitude location information and the transmission value of the relative altitude location information.

Further, the granularity of the relative longitude location information is determined by a sending party, a third party, or the user equipment; the granularity of the relative latitude location information is determined by the sending party, the third party, or the user equipment; and the granularity of the relative altitude location information is determined by the sending party, the third party, or the user equipment.

Further, the granularity of the relative longitude location information, the granularity of the relative latitude location information, and the granularity of the relative altitude location information are the same.

In addition, a computer readable medium (or a medium) is further provided, including a computer readable instruction that performs the following operation when being executed: performing the operations of step 101 to step 103, step 201 and 202, or step 301 to step 305 in the methods in the foregoing embodiments.

In addition, a computer program product is further provided, including the foregoing computer readable medium.

It should be noted that signaling mentioned in the specification includes but is not limited to: an indication, information, a signal, a message, or the like, which is not limited herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A method, comprising:
 obtaining, by a network device, location information of a reference point and location information of first user equipment;
 determining, by the network device, relative location information of the first user equipment relative to the reference point, wherein the relative location information comprises:

a granularity of relative longitude location information and a transmission value of the relative longitude location information, or a granularity of relative latitude location information and a transmission value of the relative latitude location information, or a granularity of relative altitude location information and a transmission value of the relative altitude location information, wherein the relative longitude location information is equal to a product of the granularity of the relative longitude location information and the transmission value of the relative longitude location information, the relative latitude location information is equal to a product of the granularity of the relative latitude location information and the transmission value of the relative latitude location information, and the relative altitude location information is equal to a product of the granularity of the relative altitude location information and the transmission value of the relative altitude location information; and sending, by the network device to a second user equipment, the location information of the reference point and the relative location information of the first user equipment relative to the reference point.

2. The method according to claim 1, wherein sending the relative location information of the first user equipment relative to the reference point comprises:
sending, by the network device, the relative location information of the first user equipment relative to the reference point using a broadcast channel.

3. The method according to claim 1, wherein the granularity of the relative longitude location information is determined by the network device, a third party, or a receiving party;
wherein the granularity of the relative latitude location information is determined by the network device, the third party, or the receiving party; and
wherein the granularity of the relative altitude location information is determined by the network device, the third party, or the receiving party.

4. The method according to claim 3, wherein the relative location information comprises the transmission value of the relative longitude location information, the transmission value of the relative latitude location information, and the transmission value of the relative altitude location information, and the granularity of the relative longitude location information, the granularity of the relative latitude location information, and the granularity of the relative altitude location information are determined by the network device, and wherein the method further comprises:
sending, by the network device, the granularity of the relative longitude location information, the granularity of the relative latitude location information, and the granularity of the relative altitude location information using a broadcast channel.

5. The method according to claim 1, wherein the granularity of the relative longitude location information, the granularity of the relative latitude location information, and the granularity of the relative altitude location information are the same.

6. The method according to claim 1, wherein a manner of determining, by the network device, the relative location information of the first user equipment relative to the reference point is preconfigured, and the relative location information is received from a third party, or is determined by a receiving party.

7. The method according to claim 1, wherein the second user equipment communicates with the first user equipment using device to device (D2D) communication.

8. A method, comprising:
receiving, by second user equipment, location information of a reference point and relative location information of first user equipment relative to the reference point, wherein the relative location information comprises:
a granularity of relative longitude location information and a transmission value of the relative longitude location information, or a granularity of relative latitude location information and a transmission value of the relative latitude location information, or a granularity of relative altitude location information and a transmission value of the relative altitude location information, wherein the relative longitude location information is equal to a product of the granularity of the relative longitude location information and the transmission value of the relative longitude location information, the relative latitude location information is equal to a product of the granularity of the relative latitude location information and the transmission value of the relative latitude location information, and the relative altitude location information is equal to a product of the granularity of the relative altitude location information and the transmission value of the relative altitude location information; and determining, by the second user equipment, location information of the first user equipment according to the location information of the reference point and the relative location information of the first user equipment relative to the reference point.

9. The method according to claim 8, wherein receiving the relative location information of the first user equipment relative to the reference point comprises:
receiving, by the second user equipment, the relative location information of the first user equipment relative to the reference point that is sent by the first user equipment, wherein the relative location information of the first user equipment relative to the reference point is determined by the first user equipment according to the location information of the reference point and the location information of the first user equipment.

10. The method according to claim 8, wherein receiving, by the second user equipment, the relative location information of the first user equipment relative to the reference point comprises:
receiving, by the second user equipment, the relative location information of the first user equipment relative to the reference point that is sent by a network device, wherein the relative location information of the first user equipment relative to the reference point is determined by the first user equipment according to the location information of the reference point and the location information of the first user equipment and is sent to the network device.

11. The method according to claim 10, wherein the granularity of the relative longitude location information is determined by a sending party, a third party, or the second user equipment;
wherein the granularity of the relative latitude location information is determined by the sending party, the third party, or the second user equipment; and wherein the granularity of the relative altitude location information is determined by the sending party, the third party, or the second user equipment.

12. The method according to claim 10, wherein the granularity of the relative longitude location information, the granularity of the relative latitude location information, and the granularity of the relative altitude location information are the same.

13. Second user equipment, comprising:

a receiver, configured to receive location information of a reference point and relative location information of first user equipment relative to the reference point, wherein the relative location information comprises:

a granularity of relative longitude location information and a transmission value of the relative longitude location information, or a granularity of relative latitude location information and a transmission value of the relative latitude location information, or a granularity of relative altitude location information and a transmission value of the relative altitude location information, wherein the relative longitude location information is equal to a product of the granularity of the relative longitude location information and the transmission value of the relative longitude location information, the relative latitude location information is equal to a product of the granularity of the relative latitude location information and the transmission value of the relative latitude location information, and the relative altitude location information is equal to a product of the granularity of the relative altitude location information and the transmission value of the relative altitude location information; and a processor, configured to determine location information of the first user equipment according to the location information of the reference point and the relative location information of the first user equipment relative to the reference point.

14. The second user equipment according to claim 13, wherein the receiver is configured to:

receive the relative location information of the first user equipment relative to the reference point that is sent by the first user equipment, wherein the relative location information of the first user equipment relative to the reference point is determined by the first user equipment according to the location information of the reference point and the location information of the first user equipment.

15. The second user equipment according to claim 14, wherein the receiver is configured to:

receive the relative location information of the first user equipment relative to the reference point that is sent by a network device, wherein the relative location information of the first user equipment relative to the reference point is determined by the first user equipment according to the location information of the reference point and the location information of the first user equipment and is sent to the network device.

* * * * *